(12) United States Patent
Derocher et al.

(10) Patent No.: US 8,390,663 B2
(45) Date of Patent: Mar. 5, 2013

(54) UPDATING A LOCAL VIEW (75) Inventors: Mike Derocher, Albany, OR (US);
Mark E Gorzynski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1072 days.

(21) Appl. No.: 12/361,600

(22) Filed: Jan. 29, 2009

(65) Prior Publication Data
US 2010/0188477 A1 Jul. 29, 2010

(51) Int. Cl.
*H04N 7/14* (2006.01)

(52) U.S. Cl. ............... 348/14.01; 348/14.02; 348/14.03; 348/14.08; 348/14.09; 348/14.1

(58) Field of Classification Search ...... 348/14.04–14.1; 379/202.01–207.01; 455/416; 709/204
See application file for complete search history.

(56) References Cited

U.S. PATENT DOCUMENTS

| | | | |
|---|---|---|---|
| 6,128,649 A * | 10/2000 | Smith et al. ................ 709/217 |
| 2002/0140804 A1 | 10/2002 | Colmenarez et al. |
| 2003/0174146 A1 * | 9/2003 | Kenoyer ..................... 345/619 |
| 2005/0078171 A1 * | 4/2005 | Firestone et al. ........ 348/14.08 |
| 2005/0237376 A1 * | 10/2005 | Roessler et al. .......... 348/14.04 |
| 2007/0086366 A1 * | 4/2007 | Luo et al. ................... 370/260 |
| 2008/0002818 A1 | 1/2008 | Kashimoto |
| 2008/0130525 A1 * | 6/2008 | Jansen et al. .............. 370/260 |

* cited by examiner

Primary Examiner — Joseph J Nguyen
(74) Attorney, Agent, or Firm — Chun-Liang Kuo (57) ABSTRACT

A method including creating a local view for a local endpoint, where the local view is created from a local topology for the local endpoint, where the local topology is created from a central topology, scanning for a request to change the local view for the local endpoint, and updating the local view for the local endpoint when the request to change the local view will not violate the local topology for the local endpoint and will not violate the central topology.

20 Claims, 6 Drawing Sheets

UPDATING A LOCAL VIEW

BACKGROUND

The updating and/or modifying of a view generated for a video conference conventionally involves a user from a corresponding video conference or endpoint to manually adjust camera views and magnification levels. Additionally, if the updating and/or modifying of the view may not be performed at the local endpoint, a request may be made to a user at another video conference to manually adjust camera views and magnification levels. The users often independently and manually tweak various settings without corresponding with one another, until each setting reaches an acceptable viewing level for a meeting or an event.

Furthermore, the users frequently continue to repeat this method and continually send several repeat and new requests as part of a trial and error approach in order to insure that the updated views continue to provide the desired views under different circumstances, such as when a participant enters or leaves the event or when a participant requests to make modifications to the current view.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

The present invention differs from previous approaches by maintaining a central coordination when updating a view and updating the view when the request to update the view will not violate rules established by a central multipoint controller. Further, the present invention may coordinate with the central multipoint controller to adjust an event layout. A common practice for conventional modification and/or updating of views is having a user manually modify camera views and magnification levels independently without any coordination with another endpoint or a central multipoint controller. As a result, a user may find that incorrect and inconsistent views are generated which may violate the rules established by the central multipoint controller. Further, participants at the corresponding endpoint and any additional endpoints may find that their current views are abruptly modified and changed to a non-uniform and displeasing form due to the uncoordinated modifications made by the user. Significant time and resources may thus be wasted and down time increased when attempting to correct and rectify these errors. The present invention alleviates many of the burdens of the users and/or participants, while simplifying the video conference experience to the user and insuring adherence to effective rules established by the central multipoint controller, by coordinating the process of updating a view across endpoints.

Figure 1:
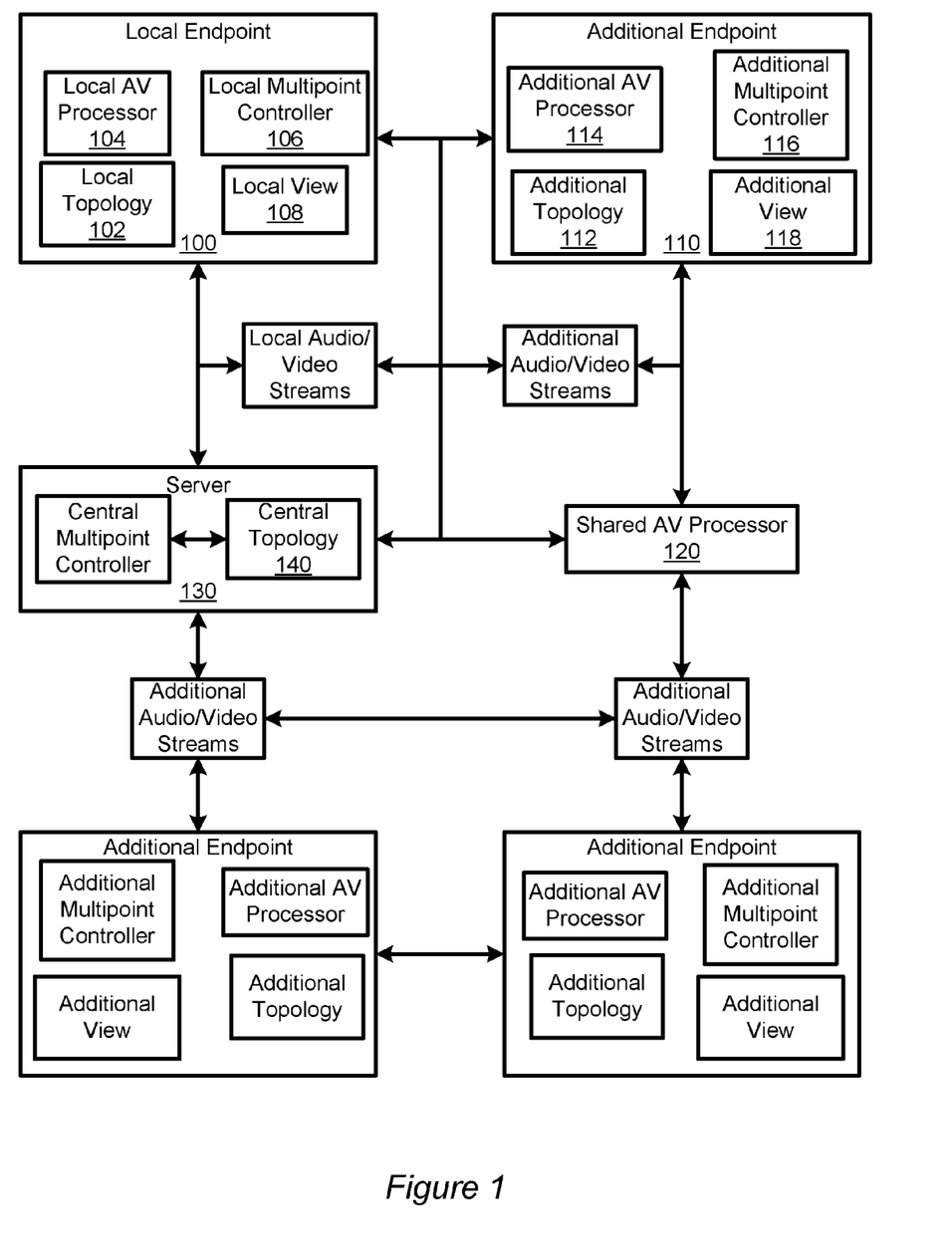
FIG. 1 illustrates a local endpoint, coupled to an additional endpoint, a server, and a shared AV processor according to an embodiment of the invention.

FIG. 1 illustrates a local endpoint, coupled to an additional endpoint, a server, and a shared AV processor according to an embodiment of the invention. Additionally, as illustrated in FIG. 1, the local endpoint may include a local multipoint controller, a local AV processor, a local topology, and a local view. The local endpoint may be a video conference environment utilized for video conferencing and/or a node coupled to a server or an additional endpoint. As noted above, the local endpoint may be coupled to a server, which may include a central multipoint controller and a central topology.

Additionally, the local endpoint may be coupled to an additional endpoint, which may further include an additional multipoint controller, an additional AV processor, an additional topology, and an additional view for the additional endpoint. The functions of the additional endpoint and its components may be similar to the local endpoint and its components. The local endpoint and the additional endpoint may include additional components and/or devices and may be attached and/or coupled to additional devices or components in addition to and/or in lieu of those depicted in FIG. 1.

As noted above, a local endpoint 100 may include a local multipoint controller 106, a local topology 102, a local AV processor 104, and a local view 108. The local multipoint controller 106 is a subsystem of the local endpoint 100 that may manage the operations of the local endpoint 100, including creating and maintaining the local topology 102 for the local endpoint 100. Additionally, the local multipoint controller 108 may manage a user interface by sending instructions to one or more components and/or devices coupled to the local endpoint 100. Further, the local multipoint controller 106 may manage the creation and maintenance of a local view 108 for the local endpoint 100 using a local AV processor 104 or a shared AV processor 120.

The local multipoint controller 106 may be firmware that is embedded onto the local endpoint 100. Additionally, the local multipoint controller 106 may be a software application stored on the local endpoint 100 through a storage medium readable and accessible by the local endpoint 100 or the local multipoint controller 106 may be stored on a computer readable medium readable and accessible by the local endpoint 100 from a different location. In another embodiment, the local multipoint controller 106 may be stored and/or accessed through an additional endpoint 110 and/or a server 130 coupled through a local area network or a wide area network. The local multipoint controller 106 may communicate with the local endpoint 100, the additional endpoint 110, the server 130, and/or other additional devices and/or components coupled to the local endpoint 100 physically or wirelessly through one or more communication channels included in or attached to the local endpoint 100.

As noted above, a local topology 102 may be created and modified, based on the central topology 140 by a central multipoint controller on the server 130 or a local multipoint controller 106 on the local endpoint 100. Further, as noted above, the local topology 102 may be created by the local multipoint controller 106. In another embodiment, the local topology 102 may be created by the central multipoint controller. A local topology 102 is a set of metadata specific to the local endpoint 100 that indicates the rules that the local endpoint 100 follows, based on the central topology 140, hardware specifications of the local endpoint 100, and the capabilities of the local endpoint 100. Additionally, the local topology 102 may indicate the type of image or video displayed on the local view 108 that may be created and/or updated by a local AV processor 104 on the local endpoint 100 or a shared AV processor 120 coupled to the local endpoint 100.

A local AV Processor 104 is a subsystem that resides on the local endpoint 100 and creates a local view 108 for the local endpoint 100 by performing audio/video signal processing of one or more local or additional audio/video streams received from the additional endpoint 110 or any additional endpoints participating in the event. Additionally, the local AV processor 104 may send one or more audio/video streams to the additional endpoint 100 or any additional endpoints participating in the event. The additional AV processor 114 on the additional endpoint 110 may receive one or more audio/video streams from the local endpoint 100 and any additional endpoint and create an additional view 118 for the additional endpoint 110. Any additional AV processor on any additional endpoint may utilize the local audio/video stream, the additional audio/video stream, and/or any additional audio/video stream from any additional endpoint participating in the event to create a corresponding view for the corresponding endpoint.

Alternatively, the local endpoint 100 and the additional endpoint 110 may utilize a shared AV processor 120 for creating a local view 108 for the local endpoint 100 and an additional view 118 for the additional endpoint 110 by performing audio/video signal processing of one or more local or additional audio/video streams and/or video streams received from the additional endpoint 110 or any additional endpoints participating in the event. A shared AV Processor 130 is a subsystem of an endpoint or an independent system that performs the role of the local AV processor 104, the additional AV processor 114, and/or any additional AV processor in the creating and/or maintaining of the local view 108 for the local endpoint 100, the creating and/or maintaining of the additional view 118 for the additional endpoint 100, and the creating and/or maintaining of any additional view for any additional endpoint participating in the event. The shared AV processor 120 may reside on the server 120, on the local endpoint 100, on the additional endpoint 110, or any additional endpoint or node. Each endpoint participating in the event receives an independent view generated from one or more audio/video stream from the local AV processor 104 and/or the shared AV processor 130 communicating with an additional AV processor 114 and/or any additional AV processor. One or more audio/video streams may include one or more video streams and/or one or more audio streams.

As noted above, a local view 108 may be created and/or maintained based on the hardware specifications of the local endpoint 100, from the set of metadata, and the rules established from the local topology 102. Additionally, the local view 108 may be created from one or more additional audio/video streams and/or video streams shared by the additional endpoint 110 utilizing the rules established by the local topology 102. Further, the local view 108 and the additional view 118 for the local endpoint 100, the additional endpoint 110, and any additional endpoints participating in the event may be created and modified using one or more additional audio/video streams and/or video streams by the local AV processor 104, the additional AV processor 114, or the shared AV processor 130. In one embodiment, the local view 108 may be an image or video of a participant participating in the event. Additionally, the local view may be an image or video of multiple participants participating in the event.

Additionally, as noted above, the local multipoint controller 106 may create a local topology 102 based on a central topology 160, which may be created, maintained, and modified by a central multipoint controller on a server 130. A server 130 is a node or an endpoint that may include a central multipoint controller and may be coupled to the local endpoint 100, the additional endpoint 110, and/or any additional endpoint. A central multipoint controller is a subsystem of the server 120 that creates and maintains a central topology 140. The central multipoint controller 120 may also create and maintain a separate corresponding topology for each corresponding endpoint. Additionally, the central multipoint controller may perform additional functions in addition to and/or in lieu of those noted above. The central multipoint controller may reside on the server 120. Additionally, the central multipoint controller may reside on a node, the local endpoint 100, the additional endpoint 110, or any additional endpoint.

A central topology 140 is a set of metadata that describes and maintains an event for the local endpoint 100, the additional endpoint 110, and/or any additional endpoint that is a participant of the event. The central topology 140 may establish certain rules that are followed throughout the event of how the local endpoint 100 and/or the additional endpoint 110 create the local view 108, the additional view 118, and any additional view with one or more local audio/video streams and/or one or more additional audio/video streams. Additionally, the central topology 140 establishes rules for how the local endpoint 100 and the additional endpoint 110 connect to one another and any additional endpoints in an event. Further, the central topology 140 may establish what actions each corresponding endpoint may perform, as well as establishing what forms of requests may be granted and/or denied. An event may include a combination of the local endpoint 100, the additional endpoint 110, and/or any additional endpoints that use any additional AV processor or the shared AV processor 130.

In one embodiment, the event may be a meeting with 4 participants from the local endpoint 100 and 4 users from the additional endpoint 110. The central topology 140 may utilize the set of metadata indicating that the event is a meeting with 8 participants and establish a set of rules for the local endpoint 100, the additional local endpoint 110, and/or any additional endpoints to follow for the meeting. The set of rules may further indicate that the local endpoint 100 and the additional endpoint 110 may need to display at least 2 participants from the endpoint at all times. The central multipoint controller, the local multipoint controller 106, the additional multipoint controller 116, and/or any additional multipoint controller participating in the event may then create a corresponding topology for the corresponding endpoint based on the rules established from the central topology 140. Each endpoint participating in the meeting may then create a corresponding local view for the corresponding endpoint based on the corresponding local topology displaying at least 2 participants from each endpoint using a corresponding AV processor on the corresponding endpoint.

In another embodiment, the event may be a video conference with one participant acting as a presenter and the remaining participants as viewers involving a server 120, the local endpoint 100, and the additional endpoint 110. The central topology 140 may utilize the metadata indicating that the event is a video conference with one presenter involving the server 120, the local endpoint 100, and the additional endpoint 110. The central topology 140 may further establish a set of rules instructing each endpoint participating in the video conference to generate an image of the presenter as the corresponding view for each endpoint. Each endpoint participating in the meeting may then create a corresponding local view for the corresponding endpoint based on the corresponding local topology displaying the presenter for each endpoint using a corresponding AV processor for each endpoint or using the shared AV processor 120.

After a local view 108 and/or an additional view 118 has been created, the local multipoint controller 106, the additional multipoint controller 116, and/or the central multipoint controller may then proceed to scan for a request to change the local view 108 for the local endpoint 100. A participant entering or leaving an event, requesting to perform a zoom operation, rearranging the local view 108, modifying a seating arrangement, and/or changing a role for the event may result in the local view 108 changing. Additional requests, instructions, and/or actions made by a participant and/or endpoint may also result in a change to the local view 108 of the local endpoint 100. A participant may reside on the local endpoint 100, the additional endpoint 110, and/or any additional endpoint participating in the event.

If a request to the local view 108 for the local endpoint 100 is detected, the local multipoint controller 106 and/or the central multipoint controller may then perform at least one from the group consisting of modifying the central topology 140 and/or modifying the local topology 102. The central topology 140 may be modified from the local topology 102, the additional topology, and/or from effects of granting requests to modifying the local view 108. The local multipoint controller 106 and/or the central multipoint controller may then proceed to determine whether the request to change the local view 108 will violate the local topology 102 for the local endpoint 100 or any additional endpoint. Alternatively, the local multipoint controller 106 and/or the central multipoint controller may skip modifying the central topology 140 and/or the local topology 102 and immediately proceed to determine whether the request to change the local view 108 will violate the local topology 102 for the local endpoint 100 or any additional endpoint.

If the local topology 102 for the local endpoint 100 or any additional topology for any additional endpoint will be violated, the local multipoint controller 106 and/or the central multipoint controller will not grant the request and proceed to continue to scan for a request to change the local view 108 for the local endpoint 100. If the local topology 102 for the local endpoint 100 or any additional topology for any additional endpoint will note be violated, the local multipoint controller 106 and/or the central multipoint controller may proceed to determine whether the request to change the local view 108 will violate the central topology 140.

If the request to change the local view 108 will violate the central topology 140, the local multipoint controller 106 and/or the central multipoint controller will not grant the request and proceed to continue to scan for a request to change the local view 108 for the local endpoint 100. If the request to change the local view 108 will not violate the central topology 140, the local multipoint controller 106 and/or the central multipoint controller will proceed to determine whether the request to change the local view 108 will require the additional endpoint 110 to modify the additional audio/video stream shared with the local endpoint 100. Additionally, the request may result in the central topology 140 being updated and/or modified.

If the request to change the local view 108 will not require the additional endpoint 110 to modify the additional audio/video stream shared with the local endpoint 100, the local multipoint controller 106 and/or the central multipoint controller may proceed to update the local view 108 for the local endpoint 100 using the existing additional audio/video stream with the local AV processor 107 or the shared AV processor 130. In one embodiment, this may occur when a participant at the local endpoint 100 requests a zoom in operation of the local view 108.

If the request to change the local view 108 will require the additional endpoint 110 to modify the additional audio/video stream shared with the local endpoint 100 and/or require the updating of the central topology 140, the local multipoint controller 106 or the central multipoint controller may proceed to instruct the additional endpoint 110 to modify the additional audio/video stream shared with the local endpoint 100. Additionally, updating the local view 108 may require the central topology 140 to be updated. The local multipoint controller 106 may then proceed to update the local view 108 for the local endpoint 100 with the local AV processor 104 or the shared AV processor 130. In one embodiment, this may occur when a participant at the local endpoint 100 requests a zoom out operation of the local view 108 and may also require that the central topology 140 be updated. The local multipoint controller 106 and/or the central multipoint controller may then proceed to determine whether the request to change the local view 108 will require the local endpoint 100 to modify the local audio/video stream shared with the additional endpoint 110.

If the request to change the local view 108 will not require the local endpoint 100 to modify the local audio/video stream shared with the additional endpoint 110, the local multipoint controller 106 and/or the central multipoint controller may then continue to scan for a request to change the local view 108 for the local endpoint and repeat the method above. If the request to change the local view 108 will require the local endpoint 100 to modify the local audio/video stream shared with the additional endpoint 110, the local multipoint controller 106 and/or the central multipoint controller may then proceed to send an instruction to the additional endpoint 110 to update the additional view 118 for the additional endpoint 110 with the modified local audio/video stream using the additional AV processor 114 or the shared AV processor 120. Additionally, as noted above, granting the request to modify and/or update the local view 108 may require that the central topology 140 may be updated. The central topology 140 may be modified and/or updated from the local topology 102, the additional topology 112, and/or any additional topology of an endpoint participating in the event.

The local multipoint controller 106 and/or the central multipoint controller may then continue to scan for a request to change the local view 108 for the local endpoint 100 from at least one from the group consisting of a participant from the local endpoint 100, the additional endpoint 110, any additional endpoint or a server coupled to the local endpoint.

Figure 2:
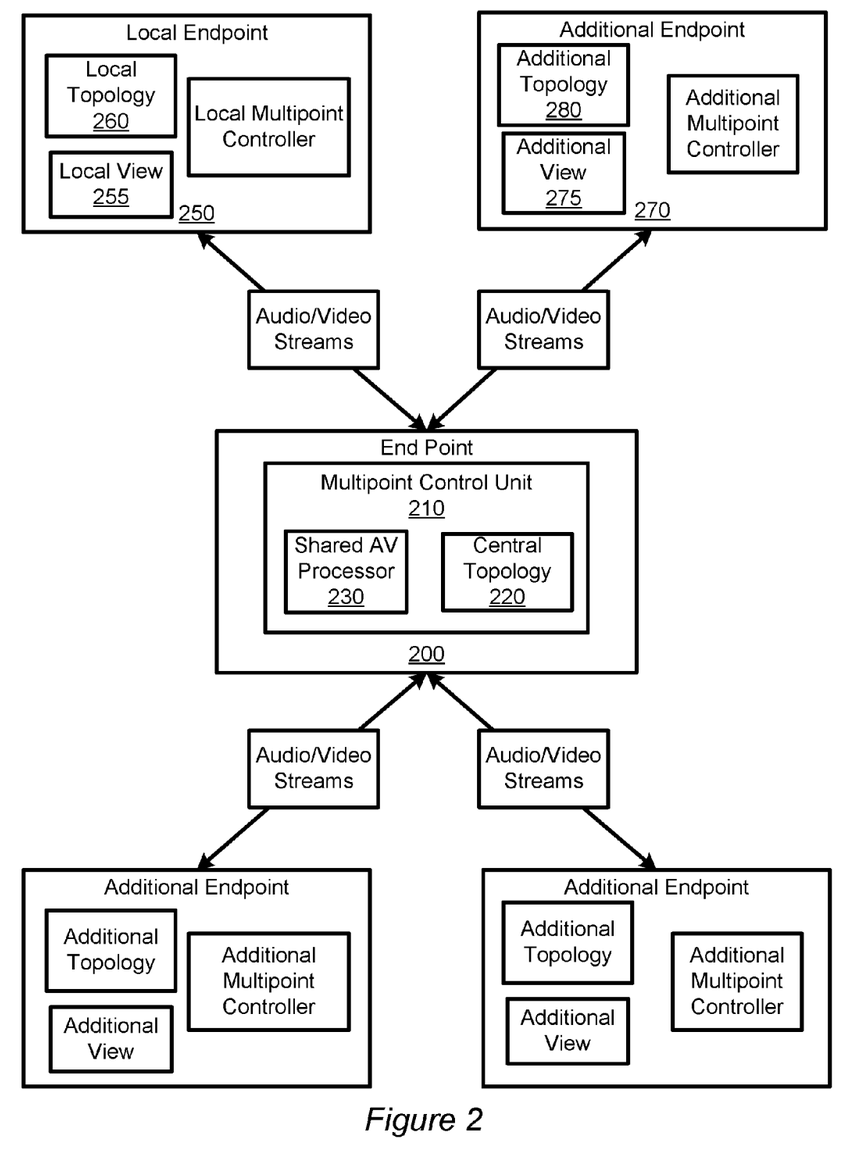
FIG. 2 illustrates a local endpoint coupled to a multipoint control unit, where the multipoint control unit creates a central topology and shares at least one local audio/video stream and at least one additional audio/video stream with the coupled local endpoint, an additional endpoint, and additional endpoints participating in an event according to an embodiment of the invention.

FIG. 2 illustrates a local endpoint coupled to a multipoint control unit, where the multipoint control unit creates a central topology and shares at least one local audio/video stream and at least one additional audio/video stream with the coupled local endpoint, an additional endpoint, and additional endpoints participating in an event according to an embodiment of the invention. Additionally, as illustrated in FIG. 2, the multipoint control unit may include a shared AV processor. The endpoint and the multipoint control unit may include additional components and/or devices and may be attached and/or coupled to additional devices or components in addition to and/or in lieu of those depicted in FIG. 2.

As noted above, a multipoint control unit 210 may be stored and executed from an endpoint 200. A multipoint control unit 210 is a subsystem of the endpoint 200 that creates and maintains a central topology 220. Additionally, the multipoint control unit 210 may create and maintain a corresponding topology for each corresponding endpoint participating in the event. Further, the multipoint control unit 210 performs audio/video signal processing of multiple audio/video streams for each endpoint participating in an event to create a local view 255 for a local endpoint 250 and an additional view 275 for an additional endpoint 270 using the multiple audio/video streams and a local topology 260 for the local endpoint 250 and an additional topology 280 for the additional endpoint 270. As a result, the multipoint control unit 210 combines the roles of the central multipoint controller and the shared AV processor illustrated in FIG. 1.

As illustrated in FIG. 2, a local endpoint 250, an additional endpoint 270, and any additional endpoint may be coupled to the endpoint 200 with the multipoint control unit 210. Additionally, as illustrated in FIG. 2, the multipoint control unit 210 may create the central topology 220 and communicate the central topology 200 to each endpoint participating in the event so that each corresponding multipoint controller will create a corresponding endpoint specific topology. In another embodiment, the multipoint control unit 210 may create a corresponding endpoint specific topology based on the central topology 220. Further, the multipoint control unit 210 may receive and send one or multiple audio/video streams from/to each endpoint participating in the event. Each endpoint or the multipoint control unit 210 may then use the corresponding audio/video streams to create a view for the corresponding endpoint. In one embodiment, the event may be a meeting with multiple participants from multiple endpoints. Each corresponding view for the corresponding endpoint may be different since each endpoint will have a different view of the different participants in the meeting. In another embodiment, the event may be a presentation from one presenter and multiple viewers on multiple endpoints. Each corresponding view for this embodiment will be the same, since each endpoint is to view the presenter for the event.

As the central multipoint controller and the local multipoint controller in FIG. 1, the multipoint control unit 210 of FIG. 2 may scan for and detect when a request to change the local view 255 is changed and whether the request to change the local view 255 may violate the central topology or any corresponding topology for any corresponding endpoint participating in the event. The multipoint control unit 210 may then proceed to update the local view 255, the additional view 275, and/or any additional view when the request to change the local view 255 will not violate the central topology 220 and any corresponding topology for any corresponding endpoint participating in the event. Additionally, the multipoint control unit 210 may update the central topology when there is a request to change the local view 255. The multipoint control unit 210 may continue to scan for and detect when a request to change the local view 255 is made and repeat the process above and disclosed above.

Figure 3A:
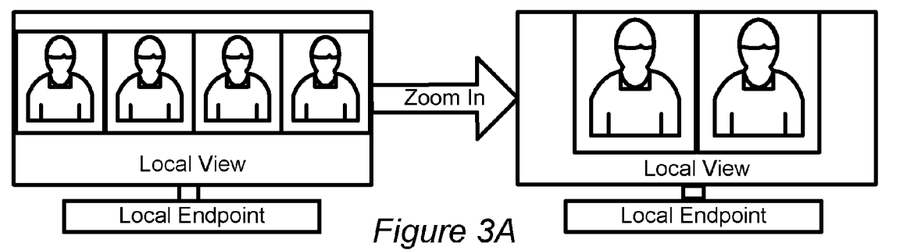
FIGS. 3A, 3B, and 3C illustrate a local view of a local endpoint changing when a request to change the local view is detected and an additional view for an additional endpoint changing when a request to change the local view is detected according to an embodiment of the invention.
Figure 3B:
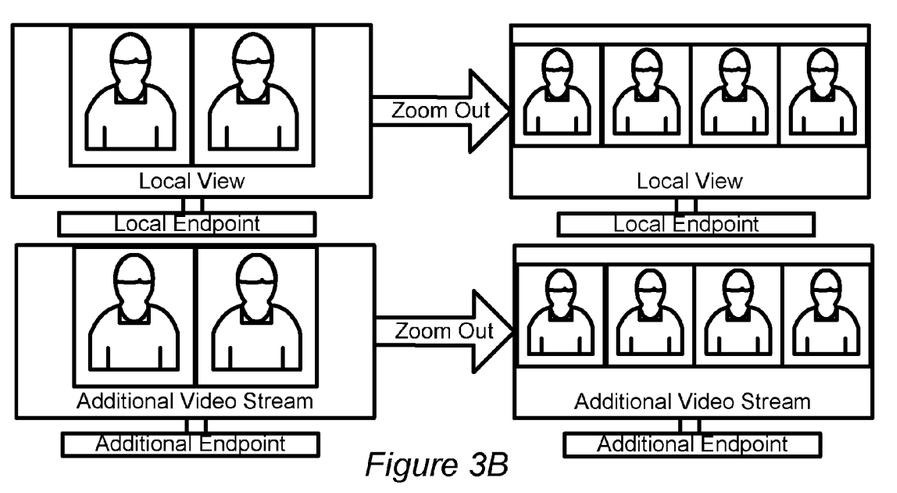
Figure 3C:
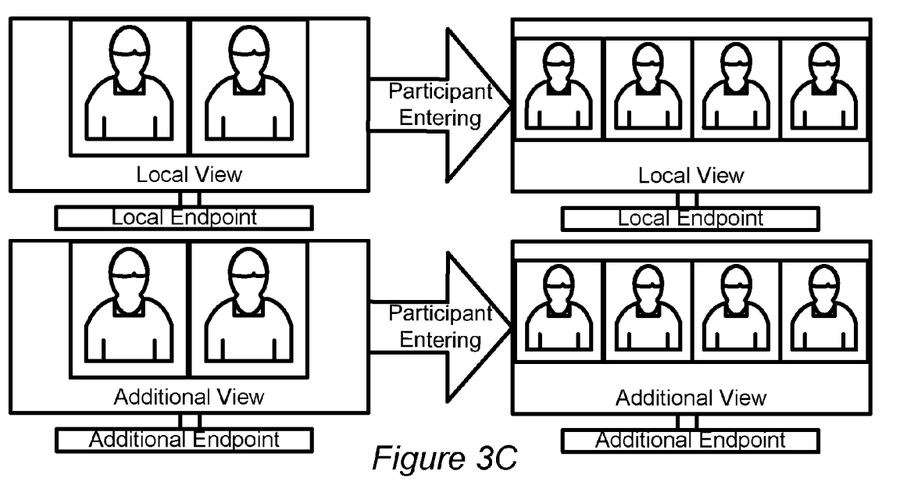

FIGS. 3A, 3B, and 3C illustrate a local view of a local endpoint changing when a request to change the local view is detected and an additional view for an additional endpoint changing when a request to change the local view is detected according to an embodiment of the invention. As noted above, a request to change the local view may be generated by a participant from a local endpoint, an additional endpoint, any additional endpoint and/or a server participating in an event. Further, a participant entering or leaving an event, requesting to perform a zoom operation, rearranging the local view, modifying a seating arrangement, and/or changing a role for the event may result in the local view changing. Additional requests and/or changes may result in the local view changing.

Further, as illustrated in FIGS. 3A, 3B, and 3C and noted above in FIG. 1, the request to change a local view may be granted if the request to change the local view does not violate a local topology and a central topology. Additionally, the request may result in the local view changing, an additional view changing, a local endpoint modifying an audio/video stream shared, and/or an additional endpoint modifying an audio/video stream shared. Further, the request to change the local view may result in the central topology being modified.

A local multipoint controller on the local endpoint may initially determine whether granting the request will violate a local topology of the local endpoint. If the request will not violate the local topology for the local endpoint, the local multipoint controller, a central multipoint controller, and/or a multipoint control unit may then proceed to determine whether granting the request will violate a central topology for the local endpoint, an additional endpoint, and/or any additional endpoint participating in the event. If granting the request will not violate the central topology, the local multipoint controller may grant the request to change the local view.

Once the request to change the local view has been found to not violate the local topology and the central topology, the local multipoint controller, the central multipoint controller, and/or a multipoint control unit may proceed to determine whether granting the request will require the local view changing, an additional view changing, a local endpoint modifying an audio/video stream shared, and/or an additional endpoint modifying an audio/video stream shared.

As illustrated in FIG. 3A, in some situations, granting the request to change the local view may require modifications to the local view for the local endpoint without modifying an additional view, modifying a current local audio/video stream shared by the local endpoint, and modifying a current additional audio/video stream shared by the additional endpoint. The request is completed with the local AV processor and/or the shared AV processor updating the local view for the local endpoint. In generating the updated local view, the local AV processor and/or the shared AV processor continue to follow the rules provided by the central topology. The additional endpoint, any additional endpoint participating in the event, the central multipoint controller, and the multipoint control unit are not consulted.

In one embodiment, as illustrated in FIG. 3A, a participant at the local endpoint may request to perform a zoom in operation. Because this is a zoom in operation, it will not require the additional endpoints to modify the current additional audio/video stream shared with the local endpoint and will not require the additional endpoint to modify the existing additional view since the local AV processor and/or the shared AV processor may utilize the existing audio/video streams shared with the local endpoint to zoom in on the desired area and/or crop out the undesired area. As a result, as illustrated in FIG. 3A, updating the local view may be done without consulting the additional endpoint, any additional endpoint participating in the event, the central multipoint controller, and the multipoint control unit. The local view may be zoomed in from showing 4 participants to showing 2 participants. In addition, the participant may make additional requests, such as rearrange the local view and modify a seating arrangement, where the local AV processor and/or the shared AV processor may utilize the existing audio/video streams shared with the local endpoint to update the local view in addition to and/or in lieu of those noted above.

In other situations, as illustrated in FIG. 3B, updating the local view may require an additional endpoint to modify the additional audio/video streams shared with the local endpoint. Additionally, the central topology may be modified as a result of this request. This is a form of request to update the local view that can not be completed by the local AV processor. The local endpoint may make a request to the additional endpoint directly or coordinate this request to the central multipoint controller to change the audio/video stream that the additional endpoint shares with the local endpoint. In generating the updated local view, the local AV processor and/or the shared AV processor continue to follow the rules provided by the central topology. This ultimately results in a request to the additional AV processor on the additional endpoint or the shared AV processor to change the audio/video stream used to update the local view. For this scenario, the additional view and current local audio/video stream shared by the local endpoint may not need to be modified.

In one embodiment, as illustrated in FIG. 3B, a participant at the local endpoint may request to perform a zoom out operation. Because this is a zoom out operation where the participant wishes to see more participants and/or area from the additional endpoint, it will require the additional endpoint to zoom out and modify the current additional audio/video stream shared with the local endpoint. Because the local view now desires to view more from the additional endpoint, the local AV processor and/or the shared AV processor may not utilize the existing audio/video streams shared by the additional endpoint. Updating the local view in this situation requires the local endpoint to consult the additional endpoint and/or any additional endpoint participating in the event and desired to be zoomed out on. As a result, as illustrated in FIG. 3B, the additional endpoint zooms out and modifies the additional video stream shared with the local endpoint, from showing 2 participants to zooming out to showing 4 participants. In one embodiment, the central topology may also be modified and/or updated to reflect this change. Further, as illustrated in FIG. 3B, the local view may be updated from showing 2 participants to showing 4 participants. In addition, a participant may make additional requests in additional to and/or in lieu of those noted above which may require the additional endpoint to modify the current additional audio/video stream shared with the local endpoint.

Further, as illustrated in FIG. 3C, updating the local view may require all endpoints participating in the event to receive updated audio/video streams to generate new views and also modifying the current audio/video streams that each endpoint participating in the event shares with other endpoints. Additionally, this form of request may result in requiring that the central topology be updated. This is a form of request to update the local view that can not be completed at the local AV processor and requires each multipoint controller on each endpoint to communicate with one another and/or the multipoint control unit to update each view on each endpoint. This ultimately results in a request to the each AV processor on the corresponding endpoint or the shared AV processor to change one or more audio/video stream shared and used to update each view on each endpoint. In generating the updated views for each endpoint, the local AV processor, any additional AV processors, and/or the shared AV processor continue to follow the rules provided by the central topology.

In one embodiment, as illustrated in FIG. 3C, the local endpoint and the additional endpoint may request to add 2 additional participants at each endpoint due to more participants entering the event. Because this is a zoom out operation where the participant wishes to see more participants at each endpoint and wishes for each endpoint to see the additional participants at the local endpoint, it will require each endpoint to zoom out and modify each audio/video stream shared with the local endpoint and each endpoint. Because each endpoint now desires to view more from each other endpoint, the local AV processor and/or the shared AV processor may not utilize the existing audio/video streams shared by the endpoints. Updating the local view in this situation requires each endpoint to modify its own local audio/video stream shared and to consult each other endpoint participating in the event.

As a result, as illustrated in FIG. 3C, the local endpoint, the additional endpoint, and any additional endpoint zoom out and modify the additional video stream shared with each other, resulting in zooming out to showing 4 participants at each endpoint. In one embodiment, this may also result in the central topology being updated and/or modified to reflect that each endpoint needs to modify each corresponding view to accommodate this zoom out operation. The participant may make additional requests in additional to and/or in lieu of those noted above which may require the local endpoint, additional endpoint, and any additional endpoint to modify the current additional audio/video stream shared with each other.

Figure 4:
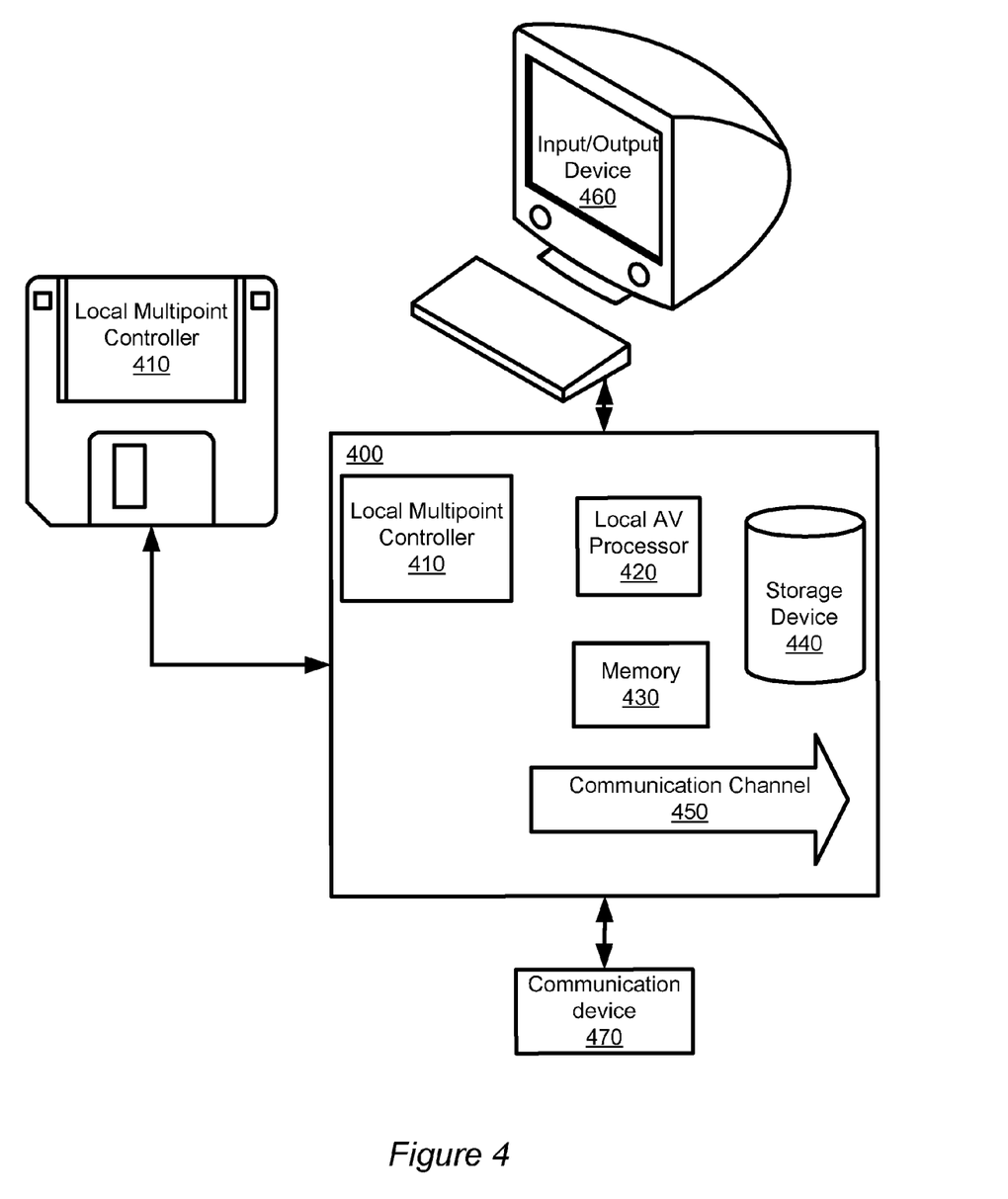
FIG. 4 illustrates a local multipoint controller software that may be embedded onto a local endpoint and/or may be stored on a removable medium being accessed by the local endpoint according to an embodiment of the invention.

FIG. 4 illustrates a local multipoint controller software that may be embedded onto a local endpoint and/or may be stored on a removable medium being accessed by the local endpoint according to an embodiment of the invention. The local multipoint controller 410 may additionally be stored and accessed from a hard drive, a compact disc, a flash disk, a network drive or any other form of computer readable medium. The local multipoint controller 410 may be stored and accessed from additional devices in addition to and/or in lieu of those depicted in FIG. 4.

Additionally, as illustrated in FIG. 4, the local endpoint 400 may be connected to an input/output device 460 and a communication device 470. The local endpoint 400 may be connected to additional devices and/or components in addition to and/or in lieu of those depicted in FIG. 4. Furthermore, the local endpoint 400 may include a local AV processor 420 to process data and/or send receive instructions, memory 430 that may be written to and/or read from, a storage device 440 for temporary or permanent storage, and one or more communication channels 450 for the local endpoint's 400 components and devices or components connected to the local endpoint 400 to utilize for communication. The local endpoint 400 may include additional components in addition to and/or in lieu of those depicted in FIG. 4.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

Figure 5:
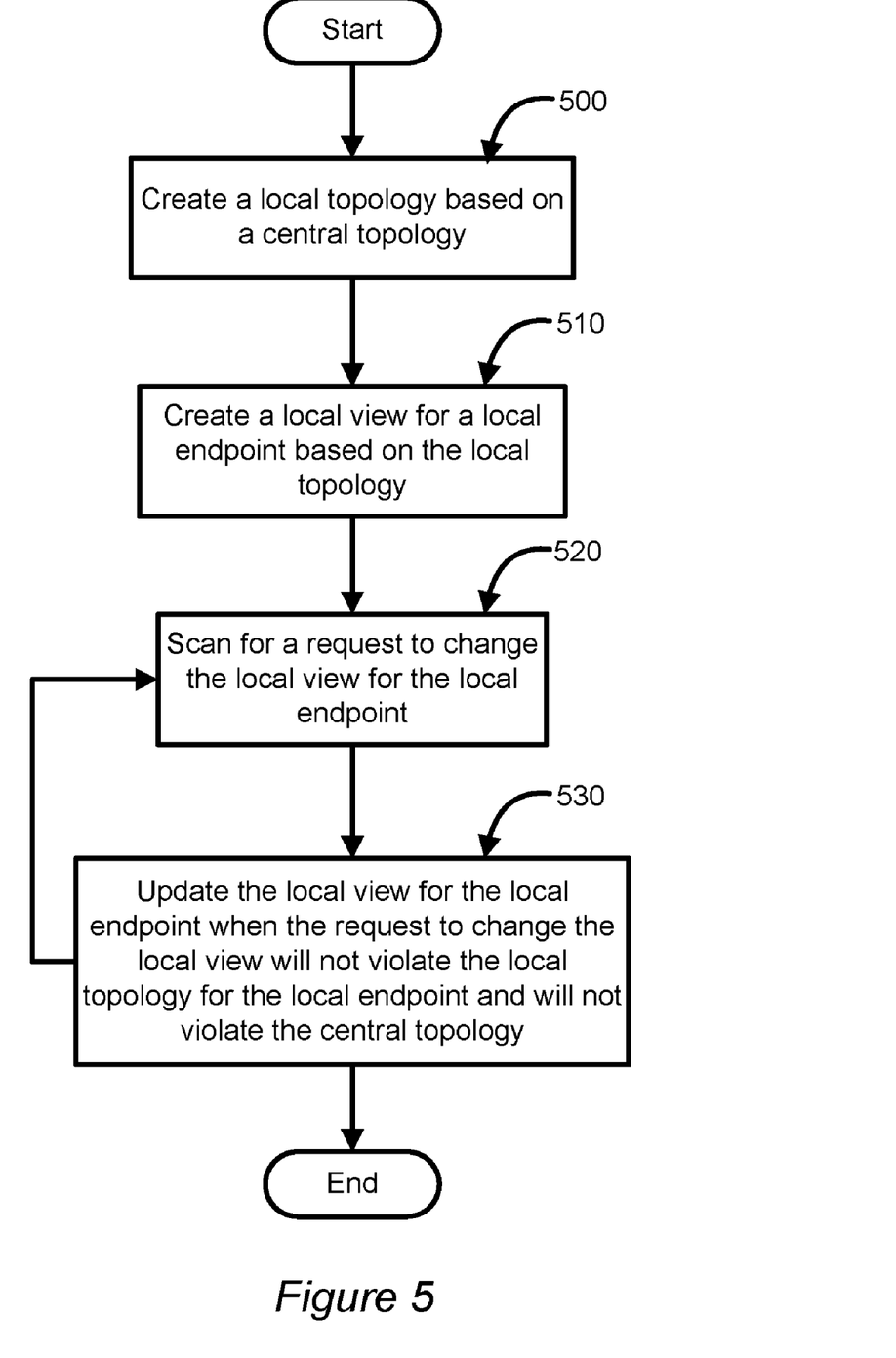
FIG. 5 is a flow chart illustrating a method for scanning for a request to change a local view for a local endpoint and updating the local view for the local endpoint when the request to change the local view will not violate a local topology and a central topology according to an embodiment of the invention.

FIG. 5 is a flow chart illustrating a method for scanning for a request to change a local view for a local endpoint and updating the local view for the local endpoint when a request to change the local view will not violate a local topology and a central topology according to an embodiment of the invention. The method of FIG. 5 may utilize a local endpoint, an additional endpoint, a server, a local topology, a central topology, and/or a local view for the endpoint. The method of FIG. 5 may utilize additional components and/or devices in addition to and/or in lieu of those noted above and illustrated in FIGS. 1 and 2.

As noted above, a local topology may be created based on a central topology 500. The local topology 510 may then be utilized to create a local view for the local endpoint 510. After the local view for the local endpoint has been created, a local multipoint controller, a central multipoint controller, and/or a multipoint control unit may then proceed to scan for a request to change the local view for the local endpoint 520. If a request to change the local view for the local endpoint is detected, the local view for the local endpoint may be updated when the request to change the local view will not violate the local topology for the local endpoint and will not violate the central topology 530.

The process may then be complete or the end point controller or the local multipoint controller, the central multipoint controller, and/or the multipoint control unit may proceed to scan for a request to change at the local view for the local endpoint and repeat the method disclosed in FIG. 5. The method of FIG. 5 may include additional steps in addition to and/or in lieu of those depicted in FIG. 5.

Figure 6:
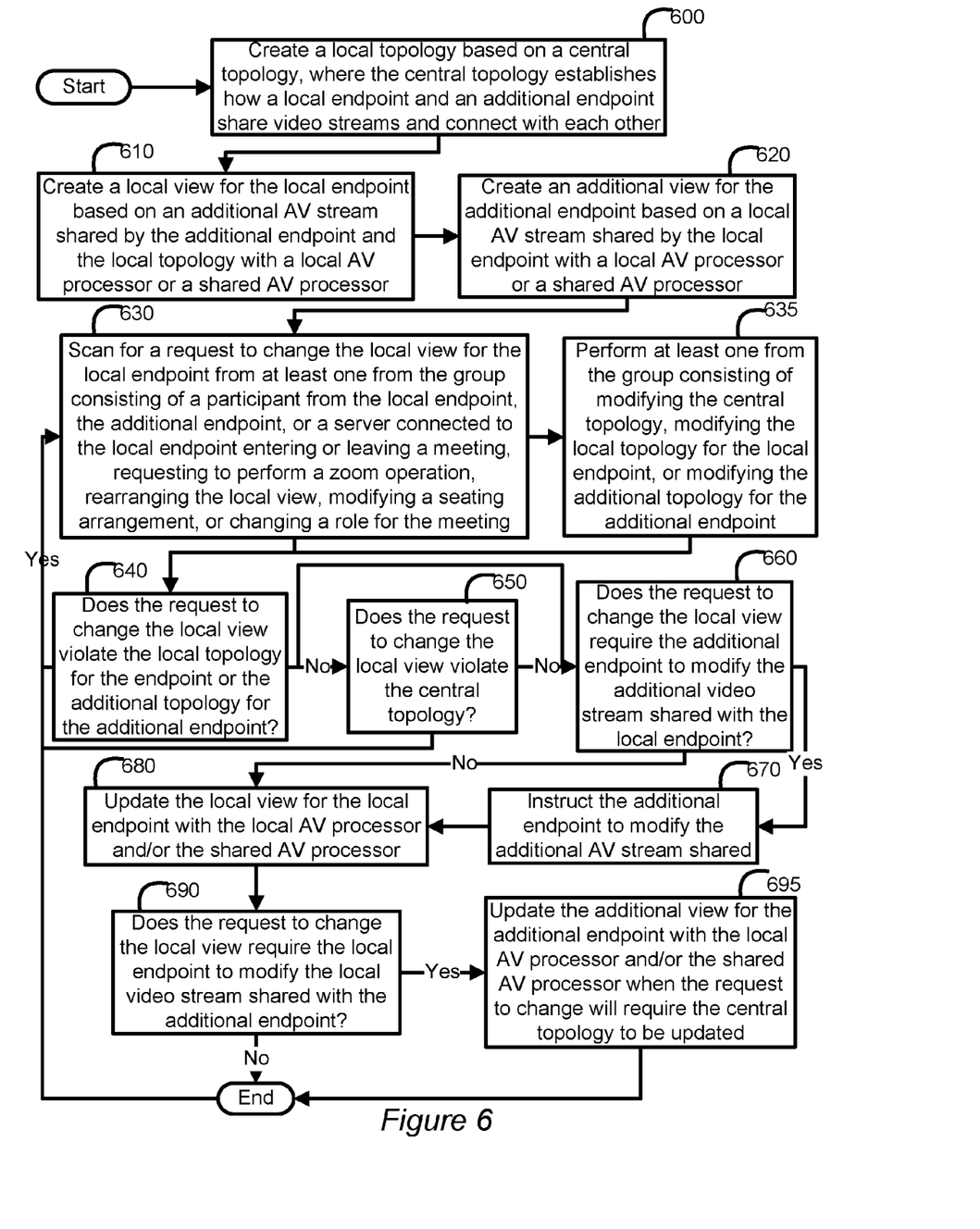
FIG. 6 is a flow chart illustrating a method for scanning for a request to change a local view for a local endpoint, updating the local view for the local endpoint when the request to change the local view will not violate a local topology and a central topology, and updating an additional view for an additional endpoint when the request to change the local view will require the central topology to be updated according to an embodiment of the invention.

FIG. 6 is a flow chart illustrating a method for scanning for a request to change a local view for a local endpoint, updating the local view for the local endpoint when the request to change the local view will not violate a local topology and a central topology, and updating an additional view for an additional endpoint when the request to change the local view will require that the central topology be updated according to an embodiment of the invention. The method of FIG. 6 may utilize a local endpoint, an additional endpoint, a server, a local topology, a central topology, a local view for the local endpoint, an additional view for an additional endpoint, a local AV processor, and/or a shared AV processor. The method of FIG. 6 may utilize additional components and/or devices in addition to and/or in lieu of those noted above and illustrated in FIGS. 1 and 2.

As noted above, a local multipoint controller may initially create a local topology based on a central topology, where the central topology establishes how the local endpoint and additional endpoints share views and connect with one other 600. A local view for the local endpoint may next be created, based on at least one additional audio/video stream shared by an additional endpoint and the local topology with a local AV processor or a shared AV processor 610. Further, an additional local view for the additional endpoint may be created based on at least one local audio/video stream shared by the local endpoint with an additional AV processor or a shared AV processor 620.

The local multipoint controller, a central multipoint controller, and/or a multipoint control unit may then scan for a request to change the local view for the local endpoint from at least one from the group consisting of a participant from the local endpoint, the additional endpoint, and/or a server connected to the local endpoint entering or leaving the event, requesting to perform a zoom operation, rearranging the local view, modifying a seating arrangement, or changing a role for the event 630.

If a request to change the local view for the local endpoint is detected, the local multipoint controller, the central multipoint controller, and/or the multipoint control unit may then perform at least one from the group consisting of modifying the central topology and modifying the local topology for the local endpoint or the additional endpoint 635. As noted above, some requests may result in the central topology being updated and/or modified. The local multipoint controller, the central multipoint controller, and/or the multipoint control unit may then proceed to determine whether the request to change the local view will violate the local topology for the local endpoint or any additional endpoint 640. Alternatively, the local multipoint controller, the central multipoint controller, and/or the multipoint control unit may skip step 635 and immediately proceed to step 640 and determine whether the request to change the local view will violate the local topology for the local endpoint or for any additional endpoint 640.

If the local topology for the local endpoint or for any additional endpoint will be violated, the local multipoint controller, the central multipoint controller, and/or the multipoint control unit will not grant the request and proceed to continue to scan for a request to change the local view 630. If the local topology for the local endpoint or for any additional endpoint will note be violated, the local multipoint controller, the central multipoint controller, and/or the multipoint control unit may proceed to determine whether the request to change the local view will violate the central topology 650. If granting the request to change will violate the central topology, the local multipoint controller, the central multipoint controller, and/or the multipoint control unit will not grant the request and proceed to continue to scan for a request to change the local view for the local endpoint 630. Alternatively, the local multipoint controller, the central multipoint controller, and/or the multipoint control unit may skip step 650 and immediately proceed to step 660.

If the request to change the local view will not violate the central topology, the local endpoint controller and/or the multipoint controller will proceed to determine whether the request to change the local view will require the additional endpoint to modify the additional audio/video stream shared with the local endpoint 660. If the request to change the local view will not require the additional endpoint to modify the additional audio/video stream shared with the local endpoint, the local view for the local endpoint may proceed to be updated a local AV processor or a shared AV processor 680.

If the request to change the local view will require the additional endpoint to modify the additional audio/video stream shared with the local endpoint, the local multipoint controller, the central multipoint controller, and/or the multipoint control unit may proceed to instruct the additional endpoint to modify the additional audio/video stream shared 670. The local view for the local endpoint may then be updated with the local AV processor and/or the shared AV processor 680. As noted above, the central topology may also be required to be updated and/or modified as a result of granting the request to change.

The local multipoint controller, the central multipoint controller, and/or the multipoint control unit may then proceed to determine whether the request to change the local view will require the local endpoint to modify a local audio/video stream shared with the additional endpoint 690. If the request to change the local view will not require the local endpoint to modify a local audio/video stream shared with the additional endpoint, the method may then be completed or the local multipoint controller, the central multipoint controller, and/or the multipoint control unit may continue to scan for a request to change the local view for the local endpoint 630. If the request to change the local view will require the local endpoint to modify the local audio/video stream shared with the additional endpoint, the local multipoint controller, the central multipoint controller, and/or the multipoint control unit may then proceed to send an instruction to update the additional view for the additional endpoint with an additional AV processor or the shared AV processor 695. As noted above, the central topology may also be required to be updated and/or modified as a result of granting the request to change.

The process may then be complete or the local multipoint controller, the central multipoint controller, and/or the multipoint control unit may continue to scan for a request to change the local view for the local endpoint and repeat the method disclosed in FIG. 6. The method of FIG. 6 may include additional steps in addition to and/or in lieu of those depicted in FIG. 6.

What is claimed is:

1. A method comprising:
    creating a local view for the local endpoint with at least one additional audio video stream shared by an additional endpoint and a local topology;
    updating the local view for the local endpoint when a request to change the local view is detected and the request to change the local view will not violate the local topology and a central topology; and
    sending a request to a central multipoint controller or the additional endpoint to modify an additional view for the additional endpoint when the request to change requires the central topology to be updated and the request to change requires the additional endpoint to modify the additional view for the additional endpoint.

2. The method of claim 1 wherein updating the local view for the local endpoint does not require an additional endpoint to change an additional audio video stream shared with the local endpoint.

3. The method of claim 1 wherein updating the local view for the local endpoint further includes an additional endpoint modifying an additional audio video stream shared with the local endpoint when the request to change the local view requires the additional endpoint to modify the additional audio video stream shared with the local endpoint.

4. The method of claim 1 further comprising:
    creating an additional view for an additional endpoint; and
    updating the additional view for the additional endpoint when the request to change will require the central topology to be updated and updating the local view based on the updated central topology requires the local endpoint to modify a local audio video stream shared with the additional endpoint.

5. The method of claim 1 further comprising:
    determining whether the request to change the local view will violate the local topology for the local endpoint;
    determining whether the request to change the local view will violate the central topology;
    determining whether the request to change the local view will violate an additional topology for an additional endpoint;
    determining whether the request to change the local view will require the additional endpoint to modify an additional audio video streams shared with the local endpoint; and
    determining whether the request to change the local view will require the local endpoint to modify a local audio video streams shared with the additional endpoint.

6. The method of claim 1 wherein the request to change the local view for the local end point is initiated by at least one from the group consisting of a participant from the local endpoint or the additional endpoint and a server coupled to the local endpoint.

7. The method of claim 1 wherein the local view and the additional view is created and modified by a local audio video processor.

8. The method of claim 7 wherein the local view and the additional view are created and modified by a shared audio video processor and the local audio video processor or the shared audio video processor are stored on at least one from the group consisting of the local endpoint, the additional endpoint, and a server.

9. A system comprising:
    a local multipoint controller executed from a local endpoint and configured to:
    create a local view for the local endpoint with at least one additional audio video stream shared by an additional endpoint and a local topology;
    update the local view for the local endpoint when a request to change the local view is detected and the request to change the local view will not violate the local topology and a central topology; and
    send a request to a central multipoint controller or the additional endpoint to modify an additional view for the additional endpoint when the request to change requires the central topology to be updated and the request to change requires the additional endpoint to modify the additional view for the additional endpoint.

10. The system of claim 9 wherein the local multipoint controller is further configured to:
    receive the local topology from the central multipoint controller;
    receive the at least one additional audio video stream of the additional endpoint; and
    send at least one local audio video stream of the local endpoint to the additional endpoint.

11. The system of claim 9 further comprising a local audio video processor configured to share a local audio video stream of the local endpoint with the additional endpoint and create and update the local view for the local endpoint using an additional audio video stream shared by the additional endpoint.

12. The system of claim 9 wherein the central topology is modified from the local topology for the local endpoint or from an additional topology for the additional endpoint.

13. The system of claim 9 wherein the central multipoint controller is stored on at least one from the group consisting of the local endpoint, the additional endpoint, and a server.

14. The system of claim 9 further comprising a shared audio video processor configured to:
    share at least one local audio video stream from the local endpoint with the additional endpoint and share the at least one additional audio video stream from the additional endpoint with the local endpoint;
    create and update the local view for the local endpoint based on the at least one additional audio video stream shared from the additional endpoint; and
    create and update the additional view for the additional endpoint based on the at least one local audio/video stream from the local endpoint.

15. The system of claim 14 wherein the shared audio video processor is stored on at least one from the group consisting of the local endpoint, the additional endpoint, and a server.

16. A computer-readable program in a non-volatile computer-readable medium comprising:

a local multipoint controller;

wherein the local multipoint controller is configured to:

access a multipoint control unit on another endpoint to create a local topology for a local endpoint and an additional topology for an additional endpoint;

create a local view for the local endpoint and an additional view for the additional endpoint using the multipoint control unit;

scan for a request to change the local view for the local end point;

update the local view for the local endpoint when the request to change the local view will not violate a local topology for the local endpoint and the central topology; and modify at least one local video stream from the local endpoint and send the local video stream to the additional endpoint when the request to change will require the central topology to be updated and the request to change requires the additional endpoint to modify the additional view for the additional endpoint.

17. The computer-readable program in a non-volatile computer-readable medium of claim 16 wherein the multipoint control unit creates and modifies the local view for the local endpoint based on at least one additional video stream; and creates and modifies the additional view for additional endpoint based on the at least one local video stream.

18. The computer-readable program in a non-volatile computer-readable medium of claim 16 wherein the central topology established how the local endpoint shares the at least one local video stream and connects with the additional endpoint and how the additional endpoint shares the at least one additional video stream and connects with the local endpoint.

19. The computer-readable program in a non-volatile computer-readable medium of claim 16 wherein the request to change the local view is initiated by at least one from the group including a participant entering or leaving an event, the participant requesting to perform a zoom operation, the participant rearranging the local view, the participant modifying a seating arrangement, and the participant changing a role for the event.

20. The computer-readable program in a non-volatile computer-readable medium of claim 16 wherein the request to change the local view for the local endpoint results in the multipoint control unit further being configured to perform at least one from the group consisting of modifying the central topology, modifying the local topology for the local endpoint, and modifying the additional topology for the additional endpoint.

* * * * *